C. A. Kellogg,
Hand Planter.
No. 48,562.   Patented July 4, 1865.
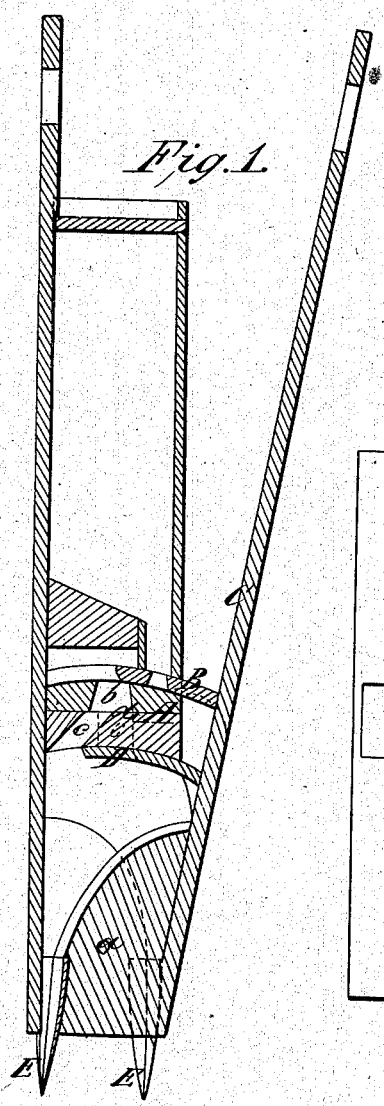
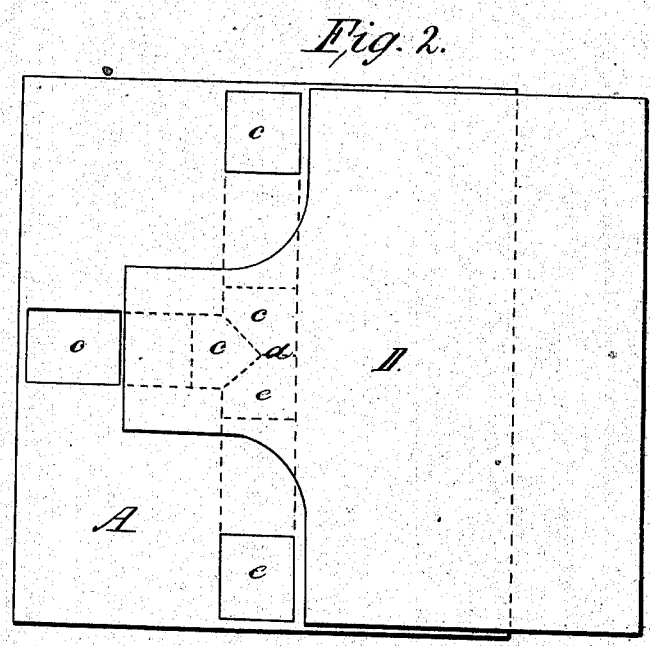
Witnesses:
H. F. Willson
J. C. Houghton
Inventor:
Clement A Kellogg

UNITED STATES PATENT OFFICE.

CLEMENT A. KELLOGG, OF ELYRIA, OHIO.

IMPROVEMENT IN HAND CORN-PLANTERS.

Specification forming part of Letters Patent No. 48,562, dated July 4, 1865.

*To all whom it may concern:*

Be it known that I, C. A. KELLOGG, of Elyria, in the county of Lorain and State of Ohio, have invented a new and useful Improvement in Hand Corn-Planters; and I do hereby declare that the following is a full and exact description thereof, reference being had to the accompanying drawings, and to the letters of reference marked thereon, in which—

Figure 1 is a vertical section. Fig. 2 is a detached vertical plan of the seed-distributer and cut-off.

The nature of my invention consists in the peculiar construction of the seed distributer, acting in combination with the seeding-slide and cut-off for the purpose of receiving the seed on the downward thrust of the machine, and thus secure the advantage of the consequent jar caused by the concussion of it when striking the soil, thus much more effectually filling the seed-recess in the seeding-slide, and at the same time, by means of the seed-distributer, divide the seed into two or more equal parts, and thence eject it into the inverters, as will be more fully described.

To enable others skilled in the art to make and use my invention, I will proceed to describe its construction and operation.

A represents the seed-distributer, its upper and under surfaces describing the segment of a circle having for its center the pin $a$, which forms the hinge on which the machine operates. In the upper side of block A there is a round hole, $b$, which receives the seed from the seeding-slide B when said slide is forced inward by pressure on handle C. When the seed is admitted into the aperture $b$ it falls onto the distributer $d$, which consists in the intersection of two or more square holes, $c\ c\ c$, so arranged that the seed will, in its downward passage, fall in equal portions into each, and be carried thence diagonally in opposite directions to the bottom of the apertures, where it will rest on the upper surface of the curved plate D or cut-off, which forms, for the time being, a stop. The seed, when in this position, is directly above the inverters E, and will, when they are closed, fall directly into them, as in that movement the curved stop D is withdrawn and the seed is free to fall. Said cut-off is secured to the handle C, and slides back and forth alternately as the intersectors are opened and closed by means of the handles, and acts simultaneously with the seeding-slide B.

Among the advantages may be briefly stated the facility with which the seed is received into the aperture in the seeding-slide in consequence of the concussion of the machine with the soil, thus rendering the dropping positive—a desideratum long sought, but never before attained.

I do not claim dividing the seed into two or more parts when taken from the seeding-chamber in bulk, nor do I claim inserting the seed in two or more places in the soil; but What I do claim as new, and desire to secure by Letters Patent, is—

The seed-distributer A, having apertures $c\ c\ c$ converging from opposite directions upward and diagonally to one common point of intersection, and thence upward perpendicularly to the upper surface of the block, in combination with sliding stop D and seeding-slide B, the whole being arranged in the manner substantially as described, and for the purpose of inserting the seed in two or more places in the soil.

CLEMENT A. KELLOGG. [L. S.]

Attest:
W. F. WILLSON,
I. C. HOUGHTON.